3,352,849
6-AZA-2'-DEOXYURIDINES
Tsung-Ying Shen, Westfield, William V. Ruyle, Scotch Plains, and Robert L. Bugianesi, Colonia, N.J., assignors to Merck & Co., Inc., Rahway, N.J., a corporation of New Jersey
No Drawing. Filed Oct. 24, 1965, Ser. No. 505,030
19 Claims. (Cl. 260—211.5)

ABSTRACT OF THE DISCLOSURE

Novel 6-aza-2'-deoxyuridine compounds which are substituted in the 5-position by halogen, haloalkyl, amino, alky substituted amino or benzylamino, are prepared by reacting a 6-azauracil with a trialkylsilylating agent to form a 2,4-O-bis(trialkylsilyl)-derivative of 6-azauracil, which is then reacted with a 2'-deoxy-3,5-diacyl-D-ribofuranosyl halide to form a blocked nucleoside. The latter compound is then solvolized to remove the blocking groups.

This application relates to nucleosides and to the method of preparing these nucleosides. More particularly, the present invention relates to novel substituted nucleosides that are useful in their own right and are also useful in the preparation of other more complicated nucleosides. Specifically, the present invention is directed to $\alpha$ and $\beta$ anomers of 6-azauracil derivatives and to the method of preparing these uracil compounds.

The novel compound of the present invention may be represented by the following structural formulae:

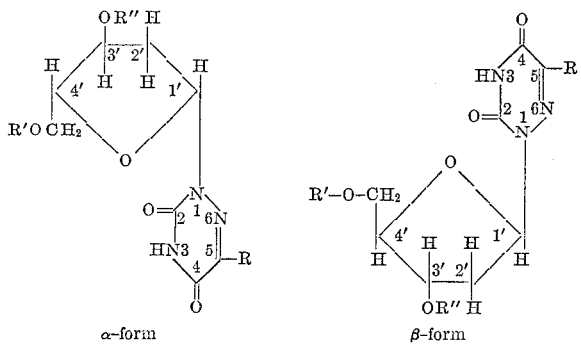

α-form      β-form wherein R may be halogen, haloalkyl, amino, or alkyl substituted amino, and R' and R" may be the same or different, hydrogen, aralkyl, acyl, or aroyl.

The object of the present invention is to provide novel 6-azauracil derivative compounds which may, if desired, be reacted to form a variety of different 6-azauracil derivatives by their conversion to nucleotide analogs to be used in the study of nucleic acid metabolism.

Another object of the present invention is to provide a novel process for the preparation of 6-azauracil derivative compounds.

An additional object of the present invention is to provide an overall process for the convenient conversion of an aza pyrimidine to a nucleoside.

Other additional objects of the present invention will become apparent to those skilled in the art by reading the following specification.

Typical of the R groups of the compounds of the present invention are halogens such as bromine, fluorine, chlorine, and iodine; haloalkyls such as bromomethyl, dibromomethyl, tribromomethyl, bromoethyl, dibromoethyl, tribromoethyl, fluoromethyl, difluoromethyl, trifluoromethyl, fluoroethyl, difluoroethyl, trifluoroethyl, chloromethyl, dichloromethyl, trichloromethyl, chloroethyl, dichloroethyl, trichloroethyl; amino; alkylamino such as methylamino, ethylamino, butylamino, dimethylamino, diethylamino, and dibutylamino; and aralkyl aminos such as benzylamino.

Both the $\alpha$ and $\beta$ anomers of the compounds of the present invention are prepared by treating a 3,5-bis(trialkylsilyloxy)-1,2,4-triazine with a protected glycosyl halide. Reaction should be carried out in a temperature range of about from 0° C. to about 180° C. and preferably between about 25° C. to about 150° C. until the reaction is complete, usually in a time from about 5 minutes to about 20 hours. The reaction depicting the preparation of the present invention is illustrated by the following flow diagram:

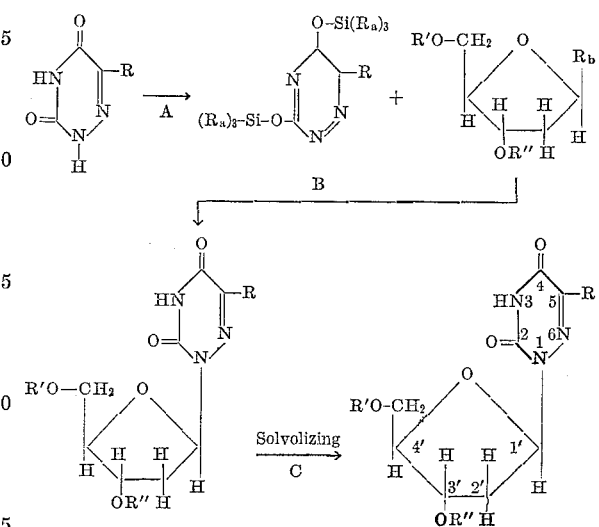

wherein R, R' and R" are as previously defined, $R_a$ is lower alkyl, and $R_b$ is chlorine or bromine.

In general, the process of the present invention involves reacting a 6-azauracil with a trialkylsilylating agent to form a 2,4-O-bis-(trialkylsilyl) derivative of the 6-azauracil which is reacted with a protected sugar halide to form a blocked nucleoside. These intermediate compounds are then solvolized to remove the blocking groups to form the 6-azauracil nucleosides of the present invention. More specifically, the process involves in Step A the reaction of a 6-azauracil with hexalkyl disilazane and trialkylsilyl chloride. In this step the reaction may be carried out in an appropriate solvent or preferably in the absence of a solvent at a temperature of from about 25° to 170° C. Selection of the solvent is not important as long as it is an inert solvent. Examples of the solvents that may be utilized in the reactions of the present invention are methylene chloride, benzene, cyclohexane and the like. The reaction is complete in from a few minutes to several hours depending on the selection of the reaction temperature. After obtaining the reaction product of Step A, this compound is then reacted in Step B with a protected sugar halide to form a blocked 6-aza nucleoside at about the same temperature range and time as in Step A. This compound is then solvolized in Step C utilizing an alkaline reagent such as ammonia, an amine or an alkali metal alkoxide in a solvent such as an alcohol containing one to four carbon atoms. The solvolizing step is carried out at reflux temperature of the solvent until the reaction is complete, usually from a few minutes to several hours.

Representative of the novel compounds obtained by the method of the present invention but by no means limited to these compounds are the $\alpha$ and $\beta$ forms of 6-aza-5-trifluoromethyl-2'-deoxyuridine,
6-aza-5-trichloromethyl-2'-deoxyuridine,
6-aza-5-tribromomethyl-2'-deoxyuridine, 6-aza-5-trifluoroethyl-2'-deoxyuridine,
6-aza-5-tribromoethyl-2'-deoxyuridine,
6-aza-5-trifluoropropyl-2'-deoxyuridine,
6-aza-5-amino-2'-deoxyuridine,
6-aza-5-methylamino-2'-deoxyuridine,
6-aza-5-dimethylamino-2'-deoxyuridine,
6-aza-5-propylamino-2'-deoxyuridine,
6-aza-5-benzylamino-2'-deoxyuridine.

The following examples illustrate the method of carrying out the present invention, but it is understood that they are given for the purpose of illustration and not of limitation.

EXAMPLE I

*Preparation of 6-bromo-3,5-bis-trimethylsilyloxy-1,2,4-triazine*

A mixture of 10 grams of 5-bromo-6-azauracil, 20 ml. of hexamethyl disilazane, and 0.5 ml. of trimethylsilyl chloride is heated at reflux for one hour. After cooling, the excess hexamethyl disilazane is removed in vacuo, the residue finally being heated at 60° under 1 mm. pressure. The product, a low-melting, amber solid weighs 17.3 grams, and is used without further purification in the next example.

EXAMPLE II

*Preparation of 1-(2'-deoxy-3',5'-di-O-p-nitrobenzoyl-β-D-ribofuranosyl)-6-aza-5-bromouracil*

A solution of 2.5 grams of 2-deoxy-3,5-di-O-p-nitrobenzoyl-D-ribofuranosyl chloride, and 3.5 grams of 6-bromo-3,5-bis-trimethylsilyloxy-1,2,4-triazine prepared as in Example I in 10 ml. of methylene chloride is evaporated under 25 ml. pressure while the temperature is increased to 130° C. The temperature is kept at 130° C. for 0.5 hour. After cooling, the reaction mixture is triturated with methylene chloride and methanol to obtain 2.9 grams of crystalline 1 - (3',5'-di-O-p-nitrobenzoyl-2'-deoxy-β-D-ribofuranosyl)-6-aza-5-bromouracil, melting point 131°–132° C.

EXAMPLE III

*Preparation of 6-aza-5-bromo-2'-deoxyuridine*

A solution of 1 gram of 1-(3',5'-di-O-p-nitrobenzoyl-2'-deoxy - β-D-ribofuranosyl)-6-aza-5-bromouracil prepared as in Example II in 60 ml. of methanol containing 2.5 grams of di-isopropyl amine is heated at reflux for 0.5 hour. The solvent is removed in vacuo, and the residue is partitioned between chloroform and water. The aqueous layer is stirred with sufficient Dowex 50 (H+) resin to remove the di-isopropyl amine, and is filtered. The filtrate is evaporated in vacuo and the 6-aza-5-bromo-2'-deoxyuridine is crystallized from acetone, melting point 214°–215° C. Specific rotation: $[\alpha]_D^{25}$ —23.2 (C=0.8, H$_2$O).

*Analysis.*—Calculated for C$_8$H$_{10}$BrN$_3$O$_5$: C, 31.18; H, 3.27; Br, 25.94. Found: C, 31.71; H, 3.25; Br, 25.53.

$\lambda_{max.}^{pH\ 1}$ 279 m$\mu$, $\epsilon$ 6,440, $\lambda_{max.}^{pH\ 13}$ 267 m$\mu$, $\epsilon$ 5,760

EXAMPLE IV

*Preparation of 1-(3',5'-di-O-acetyl-2'-deoxy-β-D-ribofuranosyl)-6-aza-5-trifluoromethyl-uracil*

A mixture of 75 mg. of 6-aza-5-trifluoromethyl-2'-deoxyuridine, 1.2 ml. of pyridine, and 1.2 ml. of acetic anhydride is heated at 80° for 15 minutes. The mixture is evaporated to dryness in vacuo, and the crude product is chromatographed on a column of silica gel, eluting with methylene chloride-methanol mixtures. Other derivatives, e.g., the di-propionyl or the di-benzoyl, may be prepared in a similar fashion, e.g., by treating the parent compound with propionic anhydride or benzoyl chloride in pyridine at 0° to 100°. By treatment of the parent compound with dihydropyran in the presence of a catalytic amount of acid, e.g., hydrochloric acid or p-toluenesulfonic acid, the corresponding 3',5'-dipyranyl ether is obtained.

EXAMPLE V

*Preparation of 5-trifluoromethyl-6-azauracil*

A solution of 15.7 grams of 6-azauracil-5-carboxylic acid, 70 grams of sulfur tetrafluoride and 28 grams of hydrogen fluoride is reacted in a sealed bomb at 100° C. for 3 hours with agitation. Excess hydrogen fluoride and sulfur tetrafluoride are evaporated and the residue is taken up in methanol, treated with charcoal, and filtered. The filtrate is then concentrated to one-half volume and methylene chloride is added. 5-trifluoromethyl-6-azauracil (14.9 grams) crystallizes; melting point 161°–162° C.

EXAMPLE VI

*Preparation of 6-trifluoromethyl-3,5-bistrimethylsilyloxy-1,2,4-triazine*

A solution of 7.75 grams of 5-trifluoromethyl-6-azauracil, as prepared in Example V, 18 ml. of hexamethyldisilazane and 0.5 ml. of trimethylsilyl chloride is refluxed for 1 hour. The solution is cooled and excess trimethylsilyl chloride and hexamethyldisilazane are evaporated at 1 mm. pressure at 60°. 6-trifluoromethyl-3,5-bis-trimethylsilyloxy-1,2,4-triazine (13.9 grams) is obtained as a brown solid. Since this compound is very sensitive to moisture, it is used in the following example without further purification.

EXAMPLE VII

*Preparation of 1-(2'-deoxy-3',5'-di-O-p-nitrobenzoyl-β-D-ribofuranosyl)-5-trifluoromethyl-6-azauracil*

A solution of 6-trifluoromethyl-3,5-bis-trimethylsilyloxy-1,2,4-triazine as prepared in Example VI (4 grams) and 2 - deoxy - 3,5 - di - O - p - nitrobenzoyl D - ribofuranosyl chloride (3 grams) in 10 ml. of methylene chloride is heated to 150° under 25 mm. pressure during which time the methylene chloride evaporates to form a molten mass. The temperature is maintained at 150° for 15 minutes, then cooled. The residue is taken up in methylene chloride and chromatographed on silica gel. Product, 1-(2'-deoxy-3',5'-di-O-p-nitrobenzoyl-β-D-ribofuranosyl)-5-trifluoromethyl-6-azauracil (2 grams) melting point at 209°–211° C. is obtained.

EXAMPLE VIII

*Preparation of 5-trifluoromethyl-6-aza-2'-deoxyuridine*

A suspension of 2 grams of 1-(2'-deoxy-3'-5'-di-O-p-nitrobenzoyl-β-D-ribofuranosyl)-5 - trifluoromethyl - 6-azauracil, as prepared in Example VII, in 5 ml. of di-iso propylamine and 125 cc. of methanol is heated to reflux for 20 minutes. The clear solution is evaporated in vacuo. The residue is partitioned between 25 cc. each of water and chloroform. The chloroform layer is washed with water. The combined aqueous layers are treated with 4 ml. of Dowex 50 (H+) resin to neutrality, and then is filtered. The filtrate is evaporated in vacuo and chromatographed on silica gel to give a single spot material, melting point 152°–153° C.

EXAMPLE IX

*Preparation of 5-methylamino-6-aza-2'-deoxyuridine*

A solution of 5 - bromo - 6 - aza - 2' - deoxyuridine and methylamine are heated to 60°–140° C. in a sealed bomb for 5 to 20 hours. The methylamine is evaporated at room temperature. The residue is then taken up in H$_2$O and evaporated in vacuo at 40°–50° C. to remove methylamine. This is then chromatographed on silica gel. When ammonia or dimethylamine is used in place of methylamine, the corresponding 5-amino or 5-dimethylamino derivative is obtained.

EXAMPLE X

*Preparation of 3',5'-di-O-acetyl-5-(N-methyl-acetamido)-6-aza-2'-deoxyuridine*

A solution of 100 mg. of 5-methylamino-6-aza-2'-deoxyuridine, 1.5 ml. of pyridine and 1.5 ml. of acetic anhydride is heated at 80°–90° C. for 15 minutes. The mixture is concentrated to dryness in vacuo, and the crude product is chromatographed on silica gel, eluting with methylene chloride-methanol mixtures.

As previously stated, the compounds of the present invention demonstrate valuable antibacterial activity. The results of in vitro assay (agar diffusion method) are illustrated in the following table. This test using 12 mm. disks soaked with 0.5, 1.0, and 2.0 mg./ml. aqueous solution of 6-aza-5-trifluoromethyl-2'-deoxyuridine is similar to that described for penicillin in Analytical Microbiology, 1963, published by Academic Press, Inc., page 327, except that the test organisms were the various bacteria as indicated and the synthetic agar medium contained potassium dihydrogen phosphate, dipotassium hydrogen phosphate, magnesium sulfate, sodium citrate, methionine, monosodium glutamate, dextrose and deionized water.

TABLE A.—IN VITRO ACTIVITY OF 6-AZA-5-TRIFLUOROMETHYL-2'-DEOXYURIDINE

| Type of Test Organism | Mg./Ml. | Zone of Inhibition, mm. |
|---|---|---|
| Bacillus subtilis | 0.5 | 13.5 |
| Bacillus subtilis | 1.0 | 14.0 |
| Bacillus subtilis | 2.0 | 15.0 |

As can be seen from the test data in Table A above, 6-aza-5-trifluoromethyl-2'-deoxyuridine, one of the compounds of the present invention, has a wide band of antibacterial activity against a number of different bacteria.

While specific embodiments of the present invention have been named and described, it will be apparent to those skilled in the art that changes may be made in the detail shown without departing from the spirit of the present invention or the scope intended. Any departure from the above description which conforms to the present invention is intended to be included within the scope of the claims.

We claim:

1. A compound of the formula

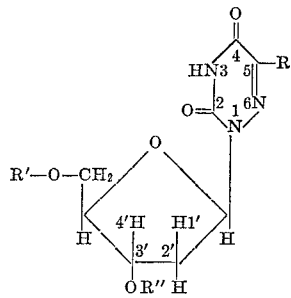

wherein R may be halogen, halogen substituted lower alkyl, amino, loweralkyl substituted amino or benzylamino; and R' and R" may be the same or different, each representing hydrogen, lower alkanoyl, benzoyl, substituted benzoyl, or pyranyl.

2. The compound of claim 1 wherein R is halogen.
3. The compound of claim 1 wherein R is halo-lower alkyl.
4. The compound of claim 1 wherein R is amino.
5. The compound of claim 1 wherein R is lower alkyl substituted amino.
6. The compound of claim 1 wherein R' and R" are hydrogen.
7. The compound of claim 1 wherein R' and R" are acetyl or p-nitrobenzoyl.
8. 6-aza-5-bromo-2'-deoxyuridine.
9. 5-trifluoromethyl-6-aza-2'-deoxyuridine.
10. A method for the production of 6-aza-5-substituted-2'-deoxyuridines of the formula

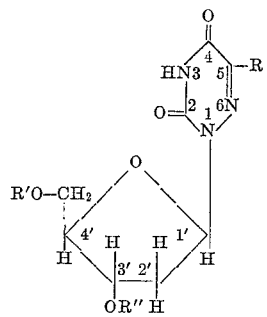

wherein R may be halogen, halogen substituted lower alkyl, amino, loweralkyl substituted amino or benzylamino; and R' and R" may be the same or different, each representing hydrogen, lower alkanoyl, benzoyl, substituted benzoyl, or pyranyl, which comprises in Step A treating a 6-azauracil with a trialkylsilylating agent to form a 6-azauracil ether of the compound

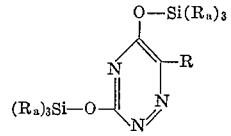

wherein R is the same as above and $R_a$ is a lower alkyl, in Step B treating said 6-azauracil ether with a compound of the formula

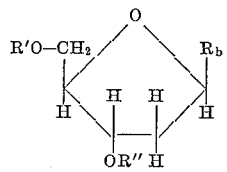

wherein R and R' are the same as above and $R_b$ is chlorine or bromine to obtain the compound thereby producing a compound having the formula

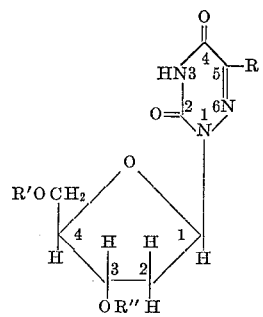

wherein R, R' and R" are the same as above and in Step B solvolizing this compound to produce 6-aza-5-substituted-2'-deoxyuridines.

11. The method according to claim 10 wherein the solvolizing agents are basic catalysts in an appropriate solvent, said basic catalyst being ammonia, amine, alkaline earth hydroxides and alkoxides and said solvent being ethanol or methanol.

12. The method according to claim 10 wherein Step A is carried out in an inert solvent.

13. The method according to claim 12 wherein said inert solvent is methylene chloride.

14. The method according to claim 10 wherein Step A and Step B are carried out at a temperature of from about 25° to about 170° C.

15. The method according to claim 10 wherein Step

C is carried out at the reflux temperature of the solvent used.

16. The method of forming 6-aza-5-bromo-2'-deoxyuridine which comprises treating 5-bromo-6-azauracil with hexamethyl disilazane and trimethylsilyl chloride, heating this mixture at reflux for one hour thereby to produce 6-bromo-3,5-bis-trimethylsilyloxy-1,2,4-triazine which is treated with 2-deoxy-3,5-di-O-p-nitrobenzoyl-D-ribofuranosyl chloride in the presence of methylene chloride at a temperature at about 130° C. for about 30 minutes thereby to produce 1-(2'-deoxy-3',5'-di-O-p-nitrobenzoyl-β-D-ribofuranosyl)-6-aza-5-bromouracil, heating said bromouracil in the presence of methanol and di-isopropyl amine for a period of about 30 minutes at reflux temperature thereby forming 6-aza-5-bromo-2'-deoxyuridine.

17. The method of forming 5-trifluoromethyl-6-aza-2'-deoxyuridine which comprises refluxing 5-trifluoromethyl-6-azauracil with hexamethyl disilazane for one hour thereby to produce 6-trifluoromethyl-3,5-bis-trimethylsilyloxy-1,2,4-triazine, said triazine being heated with 2-deoxy-3,5-di-O-p-nitrobenzoyl-D-ribofuranosyl chloride in the presence of methylene chloride at 150° C. for about 15 minutes thereby obtaining 1-(2'-deoxy-3',5'-di-O-p-nitrobenzoyl-β - D-ribofuranosyl) - 5 - trifluoromethyl - 6-azauracil, heating said ribofuranosyl uracil in the presence of methanol nad di-isopropyl amine at reflux for 20 minutes thereby forming 6-trifluoromethyl-6-aza-2'-deoxyuridine.

18. 5-methylamino-6-aza-2'-deoxyuridine.

19. 5-amino-6-aza-2'-deoxyuridine.

References Cited

UNITED STATES PATENTS

| | | | |
|---|---|---|---|
| 3,171,833 | 3/1965 | Sorm et al. | 260—211.5 |
| 3,248,380 | 4/1966 | Moffatt et al. | 260—211.5 |
| 3,280,104 | 10/1966 | Moffatt et al. | 260—211.5 |

LEWIS GOTTS, *Primary Examiner.*

J. R. BROWN, *Examiner.*

UNITED STATES PATENT OFFICE
CERTIFICATE OF CORRECTION

Patent No. 3,352,849                                  November 14, 1967

Tsung-Ying Shen et al.

It is hereby certified that error appears in the above numbered patent requiring correction and that the said Letters Patent should read as corrected below.

Column 6, line 43, for "wherein R and R′ are the same as above" read -- wherein R′ and R″ may be the same or different, each representing lower alkanoyl, benzoyl, substituted benzoyl, or pyranyl, --; lines 45 to 60, in the lower portion of the formula, the numerals within the ring reading "1", "2", "3", and "4" should read -- 1′ --, -- 2′ --, -- 3′ --, and -- 4′ --; same column 6, line 60, for "wherein R, R′ and R″ are the same as above and in Step B" read -- wherein R may be halogen, halogen substituted lower alkyl, amino, lower alkyl substituted amino or benzylamino; and R′ and R″ may be the same or different, each representing lower alkanoyl, benzoyl, substituted benzoyl, or pyranyl, and in Step C --; column 8, lines 6 and 7, for "of methanol nad di-isopropyl amine at reflux for 20 minutes thereby forming 6-trifluoromethyl-6-aza-2′-deoxy-" read -- of methanol and di-isopropylamine at reflux for 20 minutes thereby forming 5-trifluoromethyl-6-aza-2′-deoxy- --.

Signed and sealed this 21st day of January 1969.

(SEAL)
Attest:

EDWARD M. FLETCHER, JR.                          EDWARD J. BRENNER
Attesting Officer                                    Commissioner of Patents